Patented Aug. 21, 1923.

1,465,459

UNITED STATES PATENT OFFICE.

CHARLES F. WALTON, JR., OF WASHINGTON, DISTRICT OF COLUMBIA, DEDICATED, BY MESNE ASSIGNMENTS, TO THE PEOPLE OF THE UNITED STATES.

PROCESS FOR PREPARING SIRUP.

No Drawing. Application filed July 26, 1922. Serial No. 577,753.

(FILED UNDER THE ACT OF MARCH 3, 1883, 22 STAT. L., 625.)

*To all whom it may concern:*

Be it known that I, CHARLES F. WALTON, Jr., a citizen of the United States of America, and an employee of the Department of Agriculture of the United States of America, residing at Washington, D. C., have invented a new and useful Process for Preparing Sirups, of which the following is a specification.

This application is made under the act of March 3, 1883, chapter 143 (22 Stat., 625) and the invention herein described and claimed may be used by the Government of the United States, its officers and employees, and by any person in the United States either in public or private work without payment to me of any royalty thereon.

In the manufacture of so-called "golden sirup" in the refinery, a certain grade of refiner's sirup is mixed with an inverted sugar sirup. In this case, a very good grade of granulated sugar is used in preparing the invert sugar sirup, the principal reason being that when using the acid method of inversion a better product can be obtained if the "purity" of the sugar is high. If it is attempted to invert a low purity sugar or sirup with acid, some of the various impurities present act as "buffers," so that a larger amount of acid is required. The flavor and color of the product obtained by using a relatively large amount of acid are greatly inferior to the color and flavor of sirup which can be made from high purity sugar. The method of mixing refiner's sirup of suitable quality with invert sugar sirup, therefore, is considered comparatively costly and inefficient because the manufacturer must first go to the expense of making or buying a high grade sugar for the purpose of making sirup, a product which from the standpoint of manufacturing cost should be of less value than the sugar.

I have developed a process for treating the semi-sirup during manufacture, which may be a sugar-house or refinery intermediate product, or a solution of any grade of cane or beet sugar in water, with a concentrated and standardized preparation of the enzyme invertase. At the end of the inversion period, the semi-sirup is evaporated to final density either at atmospheric pressure or in vacuo, or if complete inversion has been accomplished the inverted semi-sirup may be mixed with a suitable proportion of uninverted sugar sirup. By partially inverting the sucrose the solubility of total sugars contained in the product is increased. The sirup can be boiled thicker than would otherwise be possible without crystallization of sucrose, and because of its greater density the sirup possesses improved keeping qualities. Although sirup of the proper composition may be produced by the use of the acid method of inversion in some one of its various applications, it is believed that the invertase method is more economical in cost of operation.

"Golden sirup" has also been produced by the inverting action of yeast on an intermediate refinery liquor or sugar solution of suitable quality. Although the inverting principle in this case also is the enzyme invertase, it is believed that my method of using a concentrated and standardized invertase preparation free from yeast cells is more easily controlled, and that it is preferable in addition for the reason that it is very difficult to handle ordinary yeast satisfactorily as a factory reagent. A concentrated invertase extract of known inverting power may be kept indefinitely without loss of activity and may therefore be easily used in the factory.

In practicing my process I proceed substantially as follows:

The sugar is dissolved in water to any dilution desired, but preferably to a density of 55° Brix at 15.6 C. After cooling from the temperature at which the sugar was dissolved at 60° C., sufficient invertase is added to either completely or partially invert the sucrose present in any convenient period of time. Using chemical control, I have found it preferable to invert only a sufficient proportion of the sucrose to give a sirup of the proper composition when the evaporation has been completed to the desired density. For this purpose I use 95 cc. of glacial acetic acid or an equivalent amount of some other acid, (as compared with the hydrogen ion concentration of this amount of acid) and 50 to 100 grams of a commercial invertase preparation of standardized strength, the activity of $k$ value of which is 0.44 (Journal American Chemical Society, vol. 32, p. 776, June, 1910) for every 100 gallons of semi-sirup at 55° Brix. I then permit the sirup to stand for 36 hours. The amount of invertase used may be reduced one-half by doubling the time period, or it may be reduced by insulating the tank in which the sirup is held so that the drop in temperature will be less rapid, or means may be provided for supplying heat to maintain the temperature at approximately 55–60° C., thereby securing increased efficiency of the invertase. The "apparent purity" (i. e. ratio of direct polarization to total solids, the latter being determined by Brix or Baumé hydrometer) is reduced to 22–28, and the semi-sirup is then evaporated either at atmospheric pressure or in vacuo to the desired density, preferably 40–42° Baumé at 20° C.

It is essential to heat the sirup containing the invertase to a high temperature—at least 100° C. and preferably to the boiling point at atmospheric pressure—to destroy the activity of the enzyme. This is ordinarily accomplished by open evaporation, but if concentration is done in vacuo the temperature should be raised to 100° C. before diminishing the pressure. The glacial acetic acid, or other acid, is used to increase the activity of the enzyme since invertase exhibits its maximum activity in a slightly acid medium (0.001–0.002 N). The acid itself has practically no inverting action, since it is used in such small amount.

The alternative method recommended is to completely invert the sucrose in the semi-sirup, using sufficient invertase and a convenient length of time for this purpose, and then mix the inverted product with uninverted sirup in the proportions to give the mixture the proper composition. In case this practice is followed, the amount of invertase and time required for the inversion will vary somewhat from that required for only partial inversion. This variation, however, does not materially affect the principle of the process which I claim as my invention.

The principle of the process may also be applied to sugar cane sirup, molasses, or any other sugar-house or refinery liquor containing sucrose, during the process of manufacture.

Having thus described my invention, I claim:

A process for preparing sirup from a sucrose containing solution, consisting in treating said solution with invertase free from all other sucrose-attacking enzymes, to secure partial inversion of the sucrose.

In testimony whereof, I affix my signature in the presence of two subscribing witnesses.

CHARLES F. WALTON, Jr.

Witnesses:
 HOWARD S. PAINE,
 JOHN HAMILTON.